UNITED STATES PATENT OFFICE.

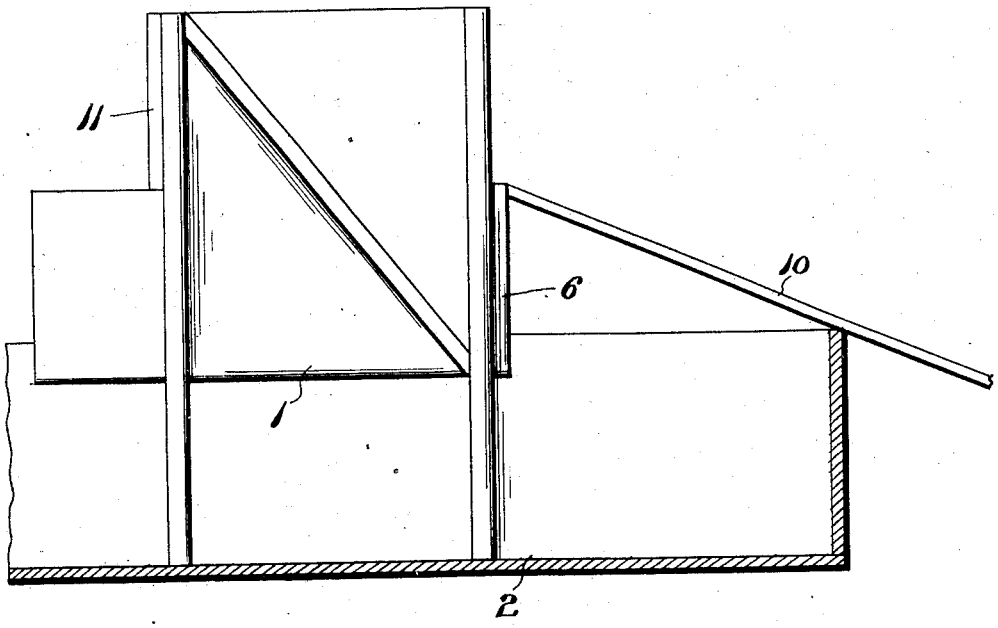
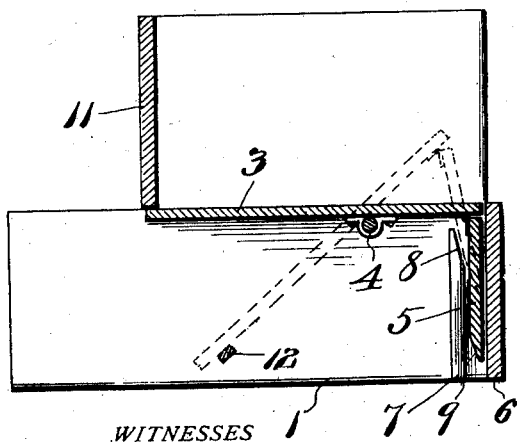
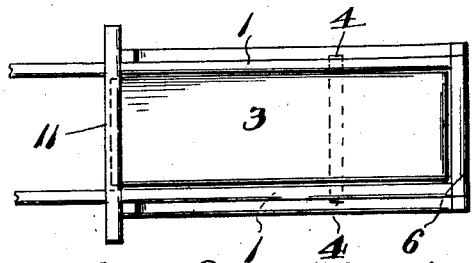

ELMER FRANK KOLOSICK, OF WASHINGTON, AND JOSEPH ALBERT KOLOSICK, OF AINSWORTH, IOWA.

ANIMAL-DIPPING DEVICE.

No. 901,623.  Specification of Letters Patent.  Patented Oct. 20, 1908.

Application filed July 8, 1908. Serial No. 442,566.

*To all whom it may concern:*

Be it known that we, ELMER FRANK KOLOSICK, a citizen of the United States, and a resident of Washington, in the county of Washington and State of Iowa, and JOSEPH ALBERT KOLOSICK, a citizen of the United States, and a resident of Ainsworth, in the county of Washington and State of Iowa, have invented certain new and useful Improvements in Animal-Dipping Devices, of which the following is a specification.

Our invention relates to devices for dipping sheep in preparation for shearing and swine and other animals, as well, in preparation for butchering or for treatment for any disease; and it has for its object the provision of a runway having a tilting floor over the pool or tank and provided with a gate hinged to its uptilting end so as to close the entrance to the dipping section to prevent more than one animal from standing on the tilting floor at one time, and also acting as a counterbalance weight to return the floor to its normal position after the animal is precipitated into the liquid in readiness for the next animal.

The construction and operation of our improved device will be described in detail hereinafter and illustrated in the accompanying drawings, in which—

Figure 1 is a side view of our improved device; Fig. 2, a longitudinal sectional view of the dipping section; and Fig. 3, a top plan view.

In the drawings similar reference characters indicate corresponding parts in all of the views.

The dipping section has the side walls 1 extending down into the tank or pool 2 and with the floor 3 mounted intermediate of its ends on bar 4. The rear end of the floor 3 has the gate 5 hinged thereon, said gate being slidably mounted between a board 6 secured to the side walls 1 and cleats 7 also secured to the side walls 1 and spaced apart from the board 6 to form slideways for the gate, the upper ends of the cleats and the lower end of the gate being beveled, as shown at 8 and 9, respectively, to prevent the gate from binding while in operation.

10 indicates an inclined gangway leading to the dipping section, and 11 a wall secured to the front end of the section to prevent the animal from seeing the liquid and balking.

12 indicates a cross-bar connecting the walls 1 to limit the swinging of the floor 3.

It will be understood that the animals are driven up the gangway 10, which is just wide enough to compel them to go in single file, and when the first animal gets into the dipping section so that its weight overcomes the equilibrium of the floor 3 the front end swings downwardly, precipitating the animal into the pool or tank 2. When the front end of the floor 3 swings downwardly, it will be understood that the rear end of the section is closed by the gate 5, so as to prevent the second animal from getting on the floor or getting its head under it, and when the animal in the dipping section slides into the pool or tank 2 the gate 5 acts as a counterweight to return the floor to its original position in readiness for the next animal, the device acting automatically.

Having thus described our improvement, what we claim is—

1. In an animal dipping device, the dipping section consisting of side walls, a floor tiltingly mounted between said walls, a door pivotally secured to the rear end of said floor, and guideways on said side walls to guide the door, substantially as shown and described.

2. In an animal dipping device, the dipping section consisting of side walls, and a front wall, a bar secured to said side walls, a floor tiltingly supported on said bar, a gate hinged to the rear end of the floor, a board secured to the rear ends of the walls, cleats secured to the side walls and spaced from said board, said cleats and board forming guideways for the door aforesaid, the upper ends of the cleats and the lower edge of the door being beveled, substantially as shown and described.

In witness whereof, we have hereunto set our hands in presence of two subscribing witnesses.

ELMER FRANK KOLOSICK.
JOSEPH ALBERT KOLOSICK.

Witnesses:
C. C. WILSON,
C. J. WILSON.